United States Patent
Gustafsson et al.

(10) Patent No.: US 6,648,479 B1
(45) Date of Patent: Nov. 18, 2003

(54) SCREENING DEVICE

(75) Inventors: Torbjörn Gustafsson, Linköping (SE); Stan Zyra, Linköping (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 09/856,152

(22) PCT Filed: Dec. 1, 1999

(86) PCT No.: PCT/SE99/02248
§ 371 (c)(1),
(2), (4) Date: Jun. 1, 2001

(87) PCT Pub. No.: WO00/33126
PCT Pub. Date: Jun. 8, 2000

(51) Int. Cl.[7] .............................................. G02B 27/00
(52) U.S. Cl. ........................ 359/613; 359/614; 359/601; 359/603
(58) Field of Search ................. 359/613, 614, 359/601, 603, 608, 299, 302, 723, 890; 348/229, 222, 362, 228; 358/213.19, 213.26, 213.27; 250/208.1

(56) References Cited

U.S. PATENT DOCUMENTS

| | | | |
|---|---|---|---|
| 3,961,181 A | 6/1976 | Golden | 250/208 |
| 4,836,652 A | 6/1989 | Oishi et al. | 350/334 |
| 5,208,698 A | 5/1993 | Muller | 359/299 |
| 5,371,698 A * | 12/1994 | Koehler | 365/114 |
| 5,638,119 A * | 6/1997 | Cornuejols | 348/229.1 |

FOREIGN PATENT DOCUMENTS

| | | |
|---|---|---|
| EP | 0 459 433 | 12/1991 |
| EP | 0 577 308 | 1/1994 |
| WO | 97/14135 | 4/1997 |

* cited by examiner

Primary Examiner—Mohammad Sikder
(74) Attorney, Agent, or Firm—Jacobson Holman PLLC

(57) ABSTRACT

A device for screening interfering radiation from a radiation source from reaching a radiation receiver. The device includes a sensing device determining the position and orientation of the radiation receiver relative to the radiation source; a matrix, positioned in front of the radiation receiver, of elements which can adopt a varying transmittance and which cover the solid angle within which it is desirable to screen interfering radiation; and control equipment which calculates in what position relative to the radiation receiver a radiation obstacle is to be placed to be able to screen the radiation source and which controls the elements of the matrix in such a manner that the matrix forms a partial or complete radiation obstacle in the estimated position.

14 Claims, 2 Drawing Sheets

SCREENING DEVICE

BACKGROUND OF THE INVENTION

1. Field of the Invention

The present invention relates to a device for screening interfering radiation from a radiation source from reaching a radiation receiver.

2. Description of the Related Art

In many cases it is a problem that a radiation receiver, within the solid angle it observes, has one or more radiation sources which render the registration of other radiation difficult. The invention provides an obstacle, controllable as to form and position, to interfering radiation, which creates favourable conditions for a radiation receiver, a sensor or a human observer.

One reason for screening interfering radiation is to reduce the risk of blinding. An example is a pilot in a fighter aircraft who can be blinded by the sun or be deliberately disturbed by a radiation source in an enemy aircraft. Also a sensor on a missile or the like can be blinded or disturbed correspondingly. There are also reasons other than binding for screening interfering radiation.

SUMMARY OF THE INVENTION

The object of the invention is to solve the problem of interfering radiation. This object is achieved by a device for screening interfering radiation from a radiation source from reaching a radiation receiver, including a device determining the position and orientation of the radiation receiver relative to the radiation source; a matrix, positioned in front of the radiation receiver, of elements which can adopt a varying transmittance and which cover the solid angle within which it is desirable to screen interfering radiation; and control equipment which calculates in what position relative to the radiation receiver a radiation obstacle is to be placed to be able to screen the radiation source and which controls the elements of the matrix in such a manner that the matrix forms a partial or complete radiation obstacle in the estimated position.

The radiation receiver may be an observer carried on a craft, such as a pilot of an aircraft or a helicopter. In this instance, the device establishing the position and orientation of the radiation receiver relative to the radiation source includes at least one sensor which gives the position and orientation of the craft relative to the surroundings and at least one sensor which gives the position and orientation of the head of the observer relative to the craft.

BRIEF DESCRIPTION OF THE DRAWINGS

The invention will now be described in more detail with reference to the accompanying drawings in which.

DETAILED DESCRIPTION OF THE PREFERRED EMBODIMENTS

Further scope of applicability of the present invention will become apparent from the detailed description given hereinafter. However, it should be understood that the detailed description and specific examples, which indicating preferred embodiments of the invention, are given by way of illustration only, since various changes and modifications within the spirit and scope of the invention will become apparent to those skilled in the art from this detailed description.

Figure 1:
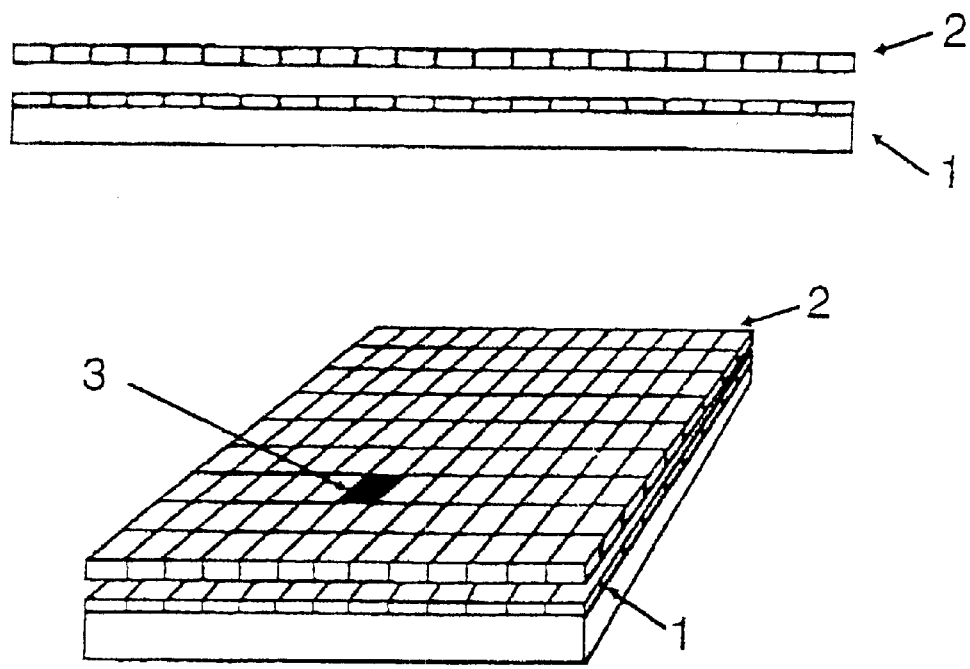
FIG. 1 shows a first embodiment of the invention in the form of a controllable screening device in front of a sensor.

In a basic design of the present invention, a controllable screening device is arranged in front of the radiation receiver. FIG. 1 illustrates an embodiment of this in an application involving a sensor. 1 designates the sensor, 2 the screening device in the form of a matrix of elements which can adopt a varying transmittance and 3 designates an element which is here shown having a low transmittance. The sensor can be manufactured with the matrix integrated directly on the image elements.

The matrix can be made, in a manner known per se, or a layer of liquid crystals which alternatively can assume a high transmittance state and a low transmittance state.

In other devices it is convenient to use a separate screening device. Moreover, previously manufactured equipment can in many cases afterwards be provided with such a screening device, and may thereby achieve the advantages of the invention.

Figure 2:
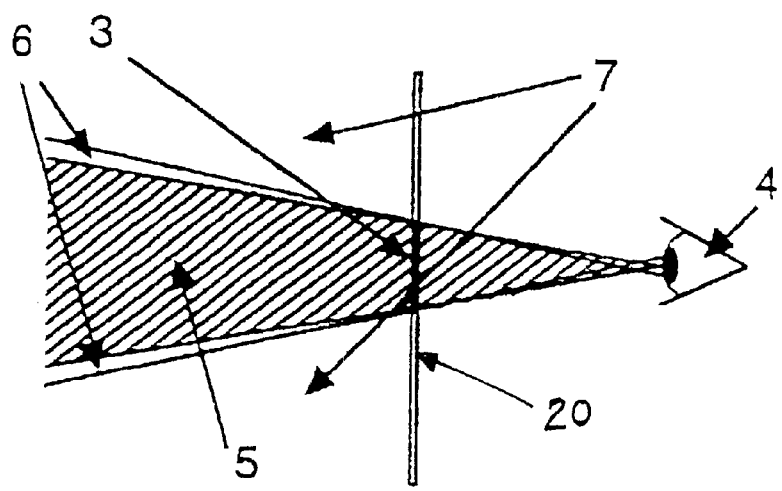
FIG. 2 shows a schematic diagram of a screening or look-through device according to the invention in front of an eye.
Figure 3:
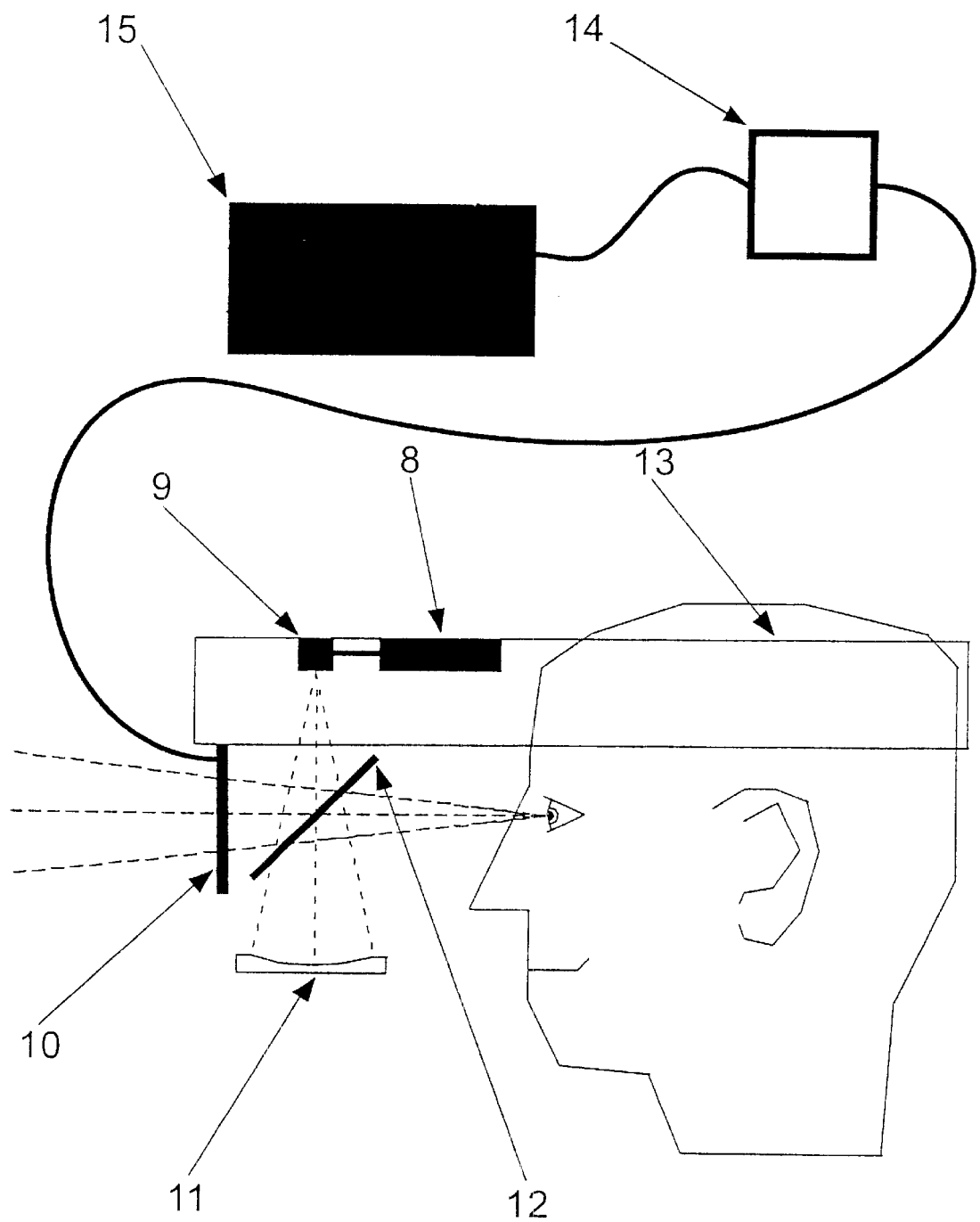
FIG. 3 shows an embodiment of a head-mounted screening and presentation device according to the invention.

For correct positioning of the screening or look-through device, as shown in FIGS. 2 and 3, a device 15 must be available to establish the position and orientation of the radiation receiver relative to the radiation source, and control equipment 14 which estimates in what position relative to the radiation receiver a radiation obstacle is to be placed to be able to screen the radiation source and which controls the elements of the matrix in such a manner that the matrix forms a radiation obstacle in a position that screens the radiation source.

In some applications, the radiation source, the radiation receiver, or both, are moving. In that case the device must be provided with sensors which continuously measure or estimate the momentaneous position of the radiation source and the position and orientation of the radiation receiver.

As mentioned above, the radiation receiver can be an eye of a fighter pilot. It goes without saying that it may also be an eye of an observer in some other craft. In this case the radiation obstacle can be provided in a look-through device 20 arranged in front of the eye. FIG. 2 shows how an obstacle 3 to an eye 4 causes a concealed field of vision 5, areas 6 which are half-concealed and a visible field of vision 7.

The position and orientation of the radiation receiver, i.e. the eye, relative to the surroundings are in this case estimated by the position and orientation of the craft, e.g. the aircraft, being measured by means of prior-art sensors and subsequently the orientation of the observer's head, often in the form of the orientation of his helmet or the like, relative to the craft, which can also be carried out by using prior-art equipment. Also the position of the radiation source is determined. Then the control equipment estimates where the radiation obstacle is to be provided and provides it in the look-through device. Independently of how the craft moves and the observer moves his head, the control equipment provides the obstacle in front of the radiation source.

A look-through device of the above-mentioned kind can also be used to present information. It is possible to arrange different types of virtual information superimposed on the surroundings in such manner that the virtual information appears to be fixedly positioned relative to the surroundings.

In some cases, various virtual objects or symbols are to be superimposed on the reality. When one wants to provide this in a position which coincides with the position of a radiation source in reality, a problem arises. This is solved according to the invention by screening the interfering radiation from the reality and after that the look-through device is used to insert the virtual information in its place.

An important type of information that may be presented is different types of symbols in or adjacent to the obstacle which indicate what is concealed by the obstacle.

FIG. 3 illustrates the principles of the invention in connection with VRD equipment (Virtual Retinal Display) for information processing, elements 8, 9, 10, 11, 12, 13 constituting a look-through device as used to present information. A laser and a laser scanner produce the information in question. The laster is designated 8 and the laser scanner 9. A controllable screening device is designated 10, a mirror is designated 11, a semitranslucent mirror is designated 12 and a fixing device for the equipment is designated 13. It is also possible to combine the screening device 10 with the semitranslucent mirror 12.

The information symbols are conveniently presented in a format which can be read against both a bright and a dark background, such as bright signs with dark surroundings.

In addition to directly screening radiation from certain objects, the invention can also be used to increase the dynamic range of the observer. This can take place by the transmittance of the look-through device being lowered for the observed parts whose intensity is high whereas the parts whose intensity is low will have a high transmittance. Also binary intensity modulators whose transmittance can only have one of two values at a point of time, can be modulated so that intermediate transmittance values can be achieved by using a modulating frequency whose periodic time is shorter than the exposure time.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for screening interfering radiation from a radiation source from reaching a radiation receiver, comprising:
   a sensing device determining a position and orientation of the radiation receiver relative to the radiation source;
   a matrix, positioned in front of the radiation receiver, of elements which provide a varying transmittance and which cover a solid angle within which it is desirable to screen interfering radiation; and
   control equipment which estimates in what position relative to the radiation receiver a radiation obstacle is to be placed to be able to screen the radiation source and which controls the elements of the matrix in such a manner that the matrix forms at least a partial radiation obstacle in the estimated position.

2. The device as claimed in claim 1, wherein the control equipment continuously estimates in what position relative to the radiation receiver the radiation obstacle is to be placed and continuously controls the elements of the matrix so that the radiation source is screened in the position where it is located at each moment.

3. The device as claimed in claim 1, wherein the elements can alternatingly assume a high transmittance state and a low transmittance state.

4. The device as claimed in claim 3, wherein the elements of the matrix consist of liquid crystals.

5. The device as claimed in claim 1, wherein the radiation receiver is an eye of an observer, and the obstacle is provided in a look-through device arranged in front of the eye.

6. The device as claimed in claim 5, wherein the observer is carried by a craft, such as a pilot of an aircraft or a helicopter, said sensing device including at least one sensor which gives the position and orientation of the craft relative to the surroundings and at least one sensor which gives the position and orientation of the head of the observer relative to the craft.

7. The device as claimed in claim 5, further comprising presentation equipment for information, said look-through device being used to present information.

8. The device as claimed in claim 7, wherein said presentation equipment presents an information symbol in or adjacent to the obstacle.

9. The device as claimed in claim 8, wherein the information symbol indicates what type of object is concealed.

10. The device as claimed in claim 7, wherein information symbols are presented in a format which can be read against a bright as well as a dark background.

11. The device as claimed in claim 3, wherein the transmittance of the elements is modulated between the high transmittance state and the low transmittance state with a modulation frequency whose periodic time is shorter than an exposure time, thereby achieving an intermediate transmittance value.

12. A device for screening interfering radiation from a radiation source from reaching a radiation receiver, comprising:
    a sensing device determining a position and orientation of the radiation receiver relative to the radiation source;
    a look-through device, positioned in front of the radiation receiver, having elements which provide a varying transmittance and which cover an angle within which it is desirable to screen interfering radiation; and
    control equipment which calculates, using an output from said sensing device, in what position relative to the radiation receive a radiation obstacle is to be placed to be able to screen the radiation source and which controls the look-through device in such a manner that said look-through device forms the radiation obstacle in the calculated position.

13. The device as claimed in claim 12, wherein the elements include a plurality of liquid crystals which alternatively assume a high transmittance state and a low transmittance state.

14. The device as claimed in claim 12, wherein the look-through device further includes:
    a laser coupled to a laser scanner for producing information;
    a controllable screening device with a mirror, coupled to said control equipment, for presenting said information along with said obstacle to said radiation receiver.

* * * * *